United States Patent
Tseng

[19]

[11] Patent Number: 6,149,072
[45] Date of Patent: Nov. 21, 2000

[54] DROPLET SELECTION SYSTEMS AND METHODS FOR FREEFORM FABRICATION OF THREE-DIMENSIONAL OBJECTS

[75] Inventor: Ampere A. Tseng, Phoenix, Ariz.

[73] Assignee: Arizona State University, Tempe, Ariz.

[21] Appl. No.: 09/064,918

[22] Filed: Apr. 23, 1998

[51] Int. Cl.[7] ...................................................... B22F 9/06
[52] U.S. Cl. ......................................................... 239/87
[58] Field of Search ................................ 164/457; 239/87

[56] References Cited

U.S. PATENT DOCUMENTS

| | | | |
|---|---|---|---|
| 3,831,728 | 8/1974 | Woods et al. | 197/1 R |
| 4,723,129 | 2/1988 | Endo et al. | 346/1.1 |
| 5,061,454 | 10/1991 | Birk | 422/119 |
| 5,266,098 | 11/1993 | Chun et al. | 75/335 |
| 5,598,200 | 1/1997 | Gore | 347/88 |
| 5,617,911 | 4/1997 | Sterett et al. | 164/457 |
| 5,722,479 | 3/1998 | Oeftering | 164/46 |
| 5,827,786 | 10/1998 | Puretz | 438/789 |
| 5,980,604 | 11/1999 | Lavernia | 75/338 |

OTHER PUBLICATIONS

Dombroski et al., The Aerodynamic Instability and Disintregration of Viscous Liquid Sheets, Chemical Engineering Science, vol. 18, pp. 203–214, 1963.

"Solid Freeform Fabrication: A New Direction in Manufacturing," J.J. Beaman, J.W. Barlow, D.L. Bourell, R.H. Crawford, H.L. Marcus and K.P. McAlea, ch. 2 (Kluwer Academic, Norwell, MA 1997).

"Rapid Prototyping and Manufacturing," ch. 16 (Society of Manufacturing Engineers, Dearborn, MI 1992).

"Effects of Droplet Thermal State on Deposit Microstructure in Spray Forming", C.–A. Chen, P. Acquaviva, J.–H. Chun and T. Ando, *Scripta Materiala*, vol. 34, pp. 689–696 (1996).

"Thermal Modeling of Deposit Solidification in Uniform Droplet Spray Forming," J.–H. Chun and T. Ando, *Proceedings of the 1996 NSF Design and Manufacturing Grantees Conference*, pp. 353–354 (Society of Manufacturing Engineers 1996).

*Primary Examiner*—Daniel J. Jenkins
*Attorney, Agent, or Firm*—Baker Botts L.L.P.

[57] ABSTRACT

An improved system for forming a three-dimensional object by selective deposition of a forming material includes a crucible for holding a reservoir of the forming material, an orifice disposed in the bottom of the crucible through which the forming material flows towards the substrate, and a droplet deposition apparatus for generating a sequence of droplets from said flow of forming material and for selectively depositing the droplets on a substrate exclusively where required to form the three-dimensional object. In a preferred embodiment, the forming material is ejected from the crucible as a variable-diameter circular liquid jet or planar jet, which breaks up into a sequence of variable-diameter droplets. Drops to be discarded are electrically charged and deflected away from the substrate by an electromagnetic deflecting device.

19 Claims, 7 Drawing Sheets

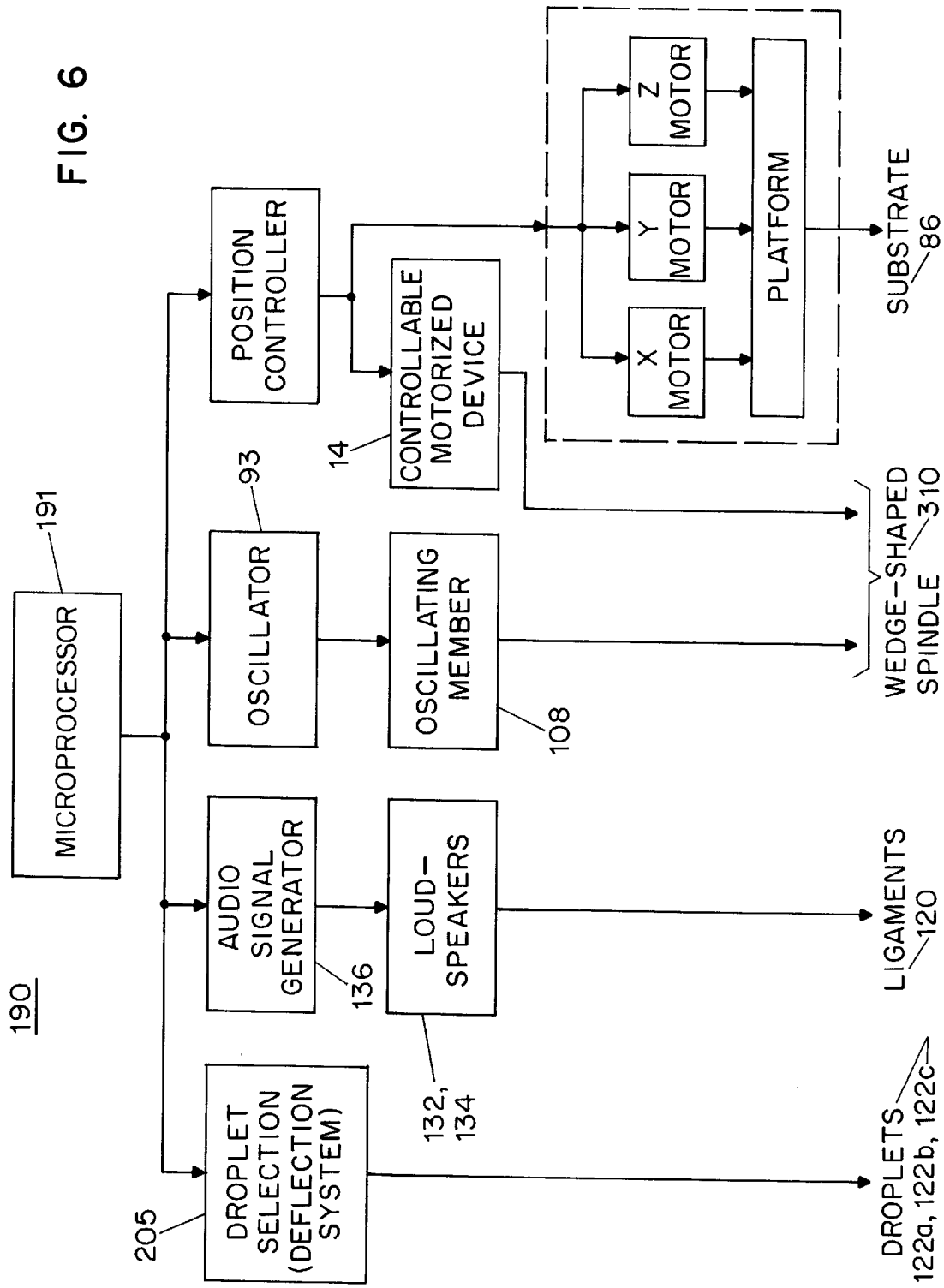

DROPLET SELECTION SYSTEMS AND METHODS FOR FREEFORM FABRICATION OF THREE-DIMENSIONAL OBJECTS

TECHNICAL FIELD OF THE INVENTION

The present invention relates in general to systems and methods for manufacturing a three-dimensional object. More particularly, the present invention relates to adaptable circular and planar jet drop deposition systems utilizing droplet selection techniques for selectively depositing molten forming materials on a position controllable substrate. The systems and methods of the present invention are especially useful in the fields of rapid prototyping and rapid fabrication.

BACKGROUND OF THE INVENTION

Freeform fabrication techniques are particularly usefull for reducing the design, production and maintenance cycle times associated with the manufacture of three-dimensional objects. In the design phase, freeform fabrication techniques are especially useful for prototyping design concepts, investigating inconsistencies in the design, and modifying the design prior to full-scale production. In addition, freeform fabrication techniques have been shown to produce higher quality products at lower cost.

However, the need presently exists for improved freeform fabrication techniques capable of producing complex structures at low cost with minimum set-up and run-time. Many recent techniques, especially in the area of complex metal structures, have been developed but remain mostly inadequate. See e.g. J. J. Beaman, J. W. Barlow, D. L. Bourell, R. H. Crawford, H. L. Marcus and K. P. McAlea, *"Solid Freeform Fabrication: A New Direction in Manufacturing,"* ch. 2 (Kluwer Academic, Norwell, Mass. 1997).

For example, drop generators have been developed and applied to freeform fabrication of three-dimensional objects. See P. F. Jacobs, *Rapid Prototyping and Manufacturing*, ch. 16 (Society of Manufacturing Engineers, Dearborn, Mich. 1992). With a conventional drop generator, molten metal is ejected as a uniform laminar liquid jet from a fixed-diameter circular injector, or nozzle, located at the bottom of a heated reservoir. The liquid jet is broken into a series of uniform drops of desired size by selecting a fixed injector diameter and varying the frequency of external oscillation near the injector or nozzle orifice. The uniform drops are then deposited in layers on a substrate surface whereupon they solidify to form the desired three-dimensional metal product.

As such, conventional drop generators are used to manufacture metal products having fine, equiaxed microstructures without manufacturing defects such as porosity or alloy segregation. See C.-A. Chen, P. Acquaviva, J.-H. Chun and T. Ando, "Effects of Droplet Thermal State on Deposit Microstructure in Spray Forming", *Scripta Materiala*, vol. 34, pp. 689–696 (1996); J.-H. Chun and T. Ando, "Thermal Modeling of Deposit Solidification in Uniform Droplet Spray Forming," *Proceedings of the 1996 NSF Design and Manufacturing Grantees Conference*, pp. 353–354 (Society of Manufacturing Engineers 1996). Conventional drop generators thus make possible rapid metal forming that does not require expensive and time-consuming post-processing of metal products.

However, despite these advantages, the manufacturing capabilities of conventional drop generators remain overly slow and restricted due to the fixed injector diameters and the relatively small range of possible drop sizes resulting therefrom. For example, in U.S. Pat. No. 5,266,098, Chun et al. disclose a conventional drop generator having a fixed diameter injector that is suitable only for spray forming and metal coating. The Chun et al. drop generator utilizes a laminar circular jet that is excited at a given frequency to break the liquid jet into a series of uniform spherical liquid droplets, which in turn solidify into solid spherical droplets. The fixed-diameter nozzle, for the most part, determines the size of the droplets, and thus relatively small fixed-diameter droplets are formed having a very limited range of possible sizes. As such, the total mass flow rate of the Chun et al. drop generator is inadequate or too slow for large-scale manufacturing and for freeform fabrication of complex and highly detailed three-dimensional objects.

Consequently, a greater variability in droplet sizes is desired to allow more efficient rapid prototyping by allowing the mass flux to be set according to the outline geometry and desired internal micro-structure of the three-dimensional object at a given point.

Recently, in U.S. application Ser. No. 09/010,923, Tseng et al. have disclosed an apparatus for freeform fabrication that utilizes circular and planar jet techniques to form complex three-dimensional objects. A first embodiment of the Tseng et al. invention utilizes a variable-diameter circular liquid jet formed by a conical nozzle, and a second embodiment utilizes a fixed-size laminar planar jet formed by a planar nozzle and external excitation to form uniform rows of droplets. The embodiment utilizing the variable-diameter circular jet is better suited for precision drop deposition since the size and mass flux of the droplets are more precisely controlled according to the specific outline geometry and desired internal micro-structure of the three-dimensional object. On the other hand, the embodiment utilizing the laminar planar jet is better suited for high-speed multiple-droplet deposition of large liquid metal sheets.

However, to further increase the efficiency of freeform fabrication processes, a need still remains for conventional drop deposition systems that selectively deposit droplets only where the desired three-dimensional object is to be formed. With such a system, three-dimensional objects can be formed at a higher degree of resolution, with greater precision and with minimal waste, and without sacrificing speed and efficiency.

Therefore, a principal object of the present invention is to provide an apparatus and method for forming three-dimensional objects wherein materials are selectively deposited in an incremental manner.

Another object of the present invention is to provide an apparatus and method for forming three-dimensional objects wherein unwanted materials are separated from materials to be used to form the three-dimensional objects.

Another object of the present invention is to provide an apparatus and method for forming three-dimensional objects wherein unused materials are deflected and recycled for later use.

Another object of the present invention is to provide an apparatus and method for forming three-dimensional objects wherein selected droplets of molten materials emanate from variable-diameter circular liquid jets.

Still another object of the present invention is to provide an apparatus and method for forming three-dimensional objects wherein selected droplets of molten materials emanate from fixed-size laminar planar jets.

Yet another object of the present invention is to provide an apparatus and method for forming three-dimensional objects wherein selected droplets of molten materials emanate from variable-size laminar planar jets.

Still another object of the present invention is to provide an apparatus and method for manufacturing high quality three-dimensional objects at low cost with minimum setup and run-times.

Further objects, features and advantages of the invention will become apparent from the following detailed description taken in conjunction with the accompanying figures showing illustrative embodiments of the invention.

SUMMARY OF THE INVENTION

The present invention relates to deposition systems and methods for manufacturing three-dimensional objects by selectively depositing a forming material on a position controllable substrate. In accordance with a preferred embodiment of the present invention, the deposition system includes an assembly for depositing the forming material having a crucible for holding a reservoir of the forming material, an orifice disposed in the bottom of the crucible through which the forming material flows towards the substrate, and a droplet deposition apparatus for generating a sequence of droplets from the flow of forming material and for selectively depositing the droplets on the substrate exclusively where required to form the three-dimensional object.

Advantageously, the deposition system deposits variable-diameter droplets of forming material only to those locations where the three-dimensional object or structure is to be formed. The system thus features a droplet selection that distinguishes between desired and undesired droplets, and which removes and recycles the undesired droplets. Droplet selection systems are disclosed for use with variable-diameter circular and, fixed-size planar and variable-thickness planar jets.

In accordance with another preferred embodiment of the present invention, the deposition system is a multi-jet system capable of depositing a plurality of forming materials. The multi-jet system includes a plurality of crucibles for holding reservoirs of forming materials, a plurality of orifices disposed one each in the crucibles through which the forming materials flow towards a substrate, and a droplet deposition apparatus for generating a sequence of droplets from the flow of forming materials and for selectively depositing the droplets on the substrate exclusively where required to form said three-dimensional object. The sequence of droplets produced by the multi-jet system can emanate from either circular or planar liquid jets flowing from the crucible.

The preferred method of the present invention includes the steps of heating a reservoir of a forming material in a container, ejecting the molten forming material from the container and through an opening formed on the bottom thereof, agitating the flow of molten forming material such that the flow breaks up into droplets flowing towards the substrate, and selectively depositing the droplets in layers on the substrate such that forming material is deposited only as required to form the three-dimensional object.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 6 is a schematic representation of a control system for use with the assembly of FIGS. 3 through 5B.

Figure 1:
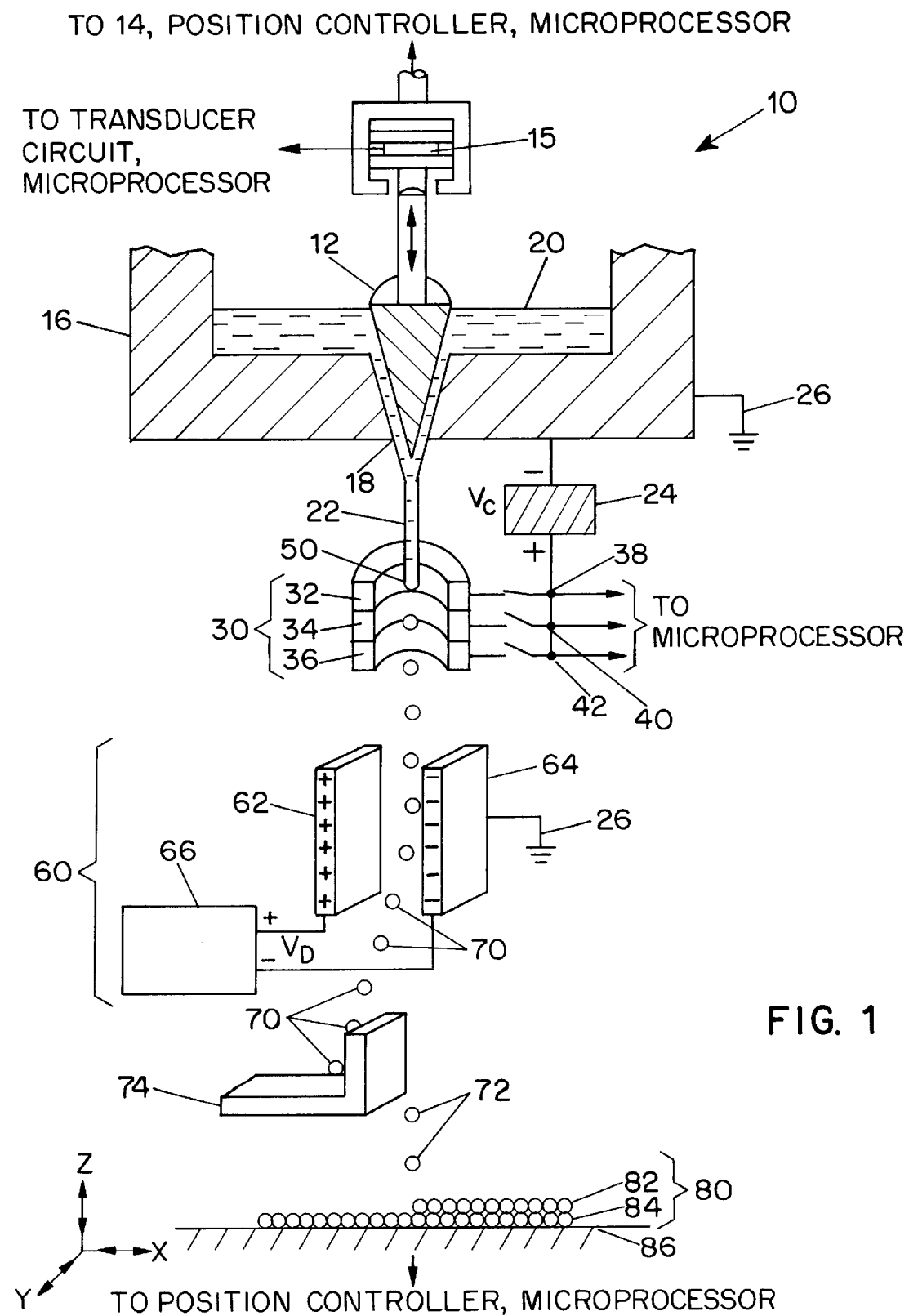
FIG. 1 is a sectional view of a preferred embodiment of an assembly for forming a three-dimensional object wherein droplets of molten forming material are selected from a sequence of variable-diameter droplets emanating from a variable-diameter circular liquid jet.

DETAILED DESCRIPTION OF THE INVENTION:

FIG. 1 illustrates a circular liquid jet drop deposition system 10 for forming a three-dimensional object, or "workpiece," 80 on a position controllable substrate 86. The drop deposition system 10, with respect to elements 12, 14, 15, 16 and 18, is a modified version of the variable-diameter circular jet apparatus described by Tseng et al. in U.S. application Ser. No. 09/010,923.

The drop deposition system 10 of FIG. 1, which is contained inside an environmentally-controlled deposition chamber (not shown), includes a heated crucible 16 for holding a reservoir 20 of molten forming material, a conical nozzle orifice 18 formed in the bottom of the heated crucible 16, and a conical spindle 12 coupled to a controllable motorized device 14 and a piezoelectric oscillating member 15 for positioning the spindle 12 with respect to the nozzle orifice 18. By varying the vertical position of the spindle 12 and its frequency of oscillation, a variable-diameter circular jet 22 of forming material is formed through the nozzle orifice 18 that breaks up into a sequence of variable-diameter droplets 50. These droplets 50 are then deposited onto the substrate 86 in incremental layers 82 and 84 to form the workpiece 80.

Although FIG.1 shows only one circular liquid jet 22, a plurality of circular liquid jets may be used depending upon the number of forming materials required to form the three-dimensional object. For example, two materials are normally required for forming a three-dimensional object by freeform fabrication—a building material and a supporting material. A typical building material can be, for example, a relatively high-melting-temperature metal, and a typical supporting material can be a low-melting-temperature wax or oligomeric hydrocarbon material that can be selectively removed by melting after completion of the deposition process. The supporting material provides a supporting structure while the workpiece, such as an overhang, is constructed. In other process methods, the supporting structure can also be built using the building material, but is built in such a way as to be easily removed, usually by manual means.

Referring again to FIG. 1, the heated crucible 16 holds and liquefies a reservoir 20 of the forming material, which is preferably placed under pressure within the heated crucible 16 by means of an external pressure source (not shown). The external pressure source typically consists of a non-reactive gas such as nitrogen or helium to prevent oxidation and other undesired effects. The pressure applied to the forming material forces the material to flow out of the conical nozzle orifice 18, resulting in formation of the circular liquid jet 22. A minimal pressure differential of approximately 20 kPa across the conical nozzle orifice 18 between the inside of the crucible 16 and the outside of the conical nozzle orifice 18 is required to form a stable circular liquid jet 22. However, a wide range of the pressure differentials ranging between 5 to 500 kPa can be applied to the crucible 16.

The liquified forming material contained within the heated crucible 16 is also subject to cyclic perturbations caused by the piezoelectric oscillating member 15, which causes the circular liquid jet 22 to break-up into a sequence of variable-diameter droplets 50. These droplets 50 are subsequently deposited on the position controllable substrate 86, which is movable along three-axes as shown in FIG. 1, to form the desired workpiece 80. Nominally, a function generator (not shown) provides an oscillation frequency ranging between a few hundred hertz to 100 kHz.

Upon exiting the nozzle orifice 18, the circular liquid jet 22 enters the deposition chamber, which itself is maintained under a vacuum or non-reactive environment filled with either nitrogen or helium. Because the circular liquid jet 22 is agitated by the piezoelectric oscillating member 15 inside the crucible, surface tension causes the circular liquid jet to break up into the sequence of droplets.

According to the preferred embodiment of the present invention, the conical spindle 12 and the conical nozzle orifice 18 are used to produce a variable-diameter liquid jet 22 as shown in FIG. 1. The spindle 12 is position-controlled and designed to cooperate with the nozzle orifice 18, which forms a circular opening in the bottom of the crucible 16 through which the circular liquid jet 22 flows. When the spindle 12 is completely recessed from the nozzle orifice 18, the flow of forming material is unimpeded and the effective diameter of the nozzle orifice 18 is equal to its actual diameter. When the spindle 12 is lowered into the conical nozzle orifice 18, the effective diameter of the nozzle orifice 18 flow area is reduced and the flow of forming material exiting the crucible follows the contour of the spindle 12 to form a circular liquid jet having a diameter smaller than the actual diameter of the conical nozzle orifice 18. The conical nozzle orifice 18 is designed such that the resulting droplets of forming material have a wide range of diameter sizes. The tip angle of the conical head of the spindle 12 can vary widely, but is nominally between 15 and 60 degrees.

The drop deposition system 10 of FIG. 1 also includes a droplet selection system for determining which droplets are deposited or discarded. The droplet selection system includes an electrical charging device 30 for applying an electrical charge to selected ones of the droplets 50, a deflector device 60 for deflecting the charged droplets 70, and a gutter structure 74 for accumulating the deflected droplets 70 for collection and reuse. As such, the electrical charging device 30 and the deflector device 60 divert the selected, "undesired" charged droplets 70 away from the substrate 86 while allowing the "desired" uncharged droplets 72 to fall unimpeded onto the substrate 86 or the partially completed workpiece 80.

As further shown in FIG. 1, the electric charging device 30 is preferably a modulated, multi-segmented ring electrode having a plurality of individually addressable electrode segments, shown as electrode segments 32, 34 and 36. The electrode segments 32, 34 and 36 are connected to a power supply 24 via separately addressable switches 38, 40 and 42, and are located within the region where the droplets break off from the circular liquid jet 22. Advantageously, when a drop is identified for deflection, the electrode segment closest to the "break-off" location is activated and a charge is applied to that droplet.

The "break-off" location for a given droplet is dependent on the diameter of the circular liquid jet 22 and the frequency of the piezoelectric oscillation as discussed above. Since the diameter of the circular liquid metal jet 22 is determined in part by the vertical position of the conical-headed spindle 12, the break-off location thus varies as a function of the vertical position of the conical-headed spindle 12. The lower the position of the spindle 12 with respect to the nozzle orifice 18, the higher the "break-off" location for the droplet 50. Conversely, the higher the position of the spindle 12 with respect to the nozzle orifice 18, the lower the "break-off" location for the droplet 50.

The electrode charging device 30 of FIG. 1 is thus designed to operate in response to the variations of the diameter of the circular liquid metal jet, and thus the "break-off" point for the droplets. Depending upon the diameter of the circular liquid 22 jet and frequency of the piezoelectric oscillating member 15, a microprocessor (not shown) calculates the "break-off" location and activates the closest electrode segment 32, 34 or 36. The microprocessor, using a process prediction model, calculates the "break-off" location and sends the appropriate control signals to activate the closest electrode. Preferably, as shown in FIG. 1, the electrode segments 32, 34 and 36 are activated by opening and closing the corresponding addressable switches 38, 40 and 42.

The electrical charging of the selected, or "undesired" droplets operates as follows. For a selected droplet, the electrode segment closest to the droplet's "break-off" point is positively charged with the power supply voltage $V_c$ and as such electrostatic attraction causes electrons within the circular liquid jet 22 to be drawn to its edge. Some of these electrons are contained within the selected droplet and are carried away after the selected droplet detaches from the circular liquid jet 22. Once the selected droplet separates from the circular liquid jet 22, the droplet is electrically isolated and the charge cannot leak away even if the voltage on a nearby electrode segment changes.

As shown in FIG. 1, the drop deposition system 10 is thus operated to produce charged and uncharged molten metal droplets 70 and 72, respectively, from the variable-diameter circular liquid jet 22. The uncharged droplets 72 are incrementally deposited on the workpiece 80, and the charged droplets 70 are deflected away into the gutter structure 74 by the deflecting device 60. As such, molten metal droplets are deflected or allowed to be deposited based on the geometry of the workpiece 80 to be formed on the substrate 86.

Preferably, the deflecting device 60 is a constant voltage deflection plate having a pair of oppositely charged deflecting electrodes 62 and 64 connected to a power supply 66. Deflecting electrode 64 can be connected to ground 26. The deflecting electrodes 62 and 64 are aligned vertically and horizontally on either side and parallel to the trajectory of the falling droplets, some of which are charged 70 and some of which are uncharged 72. As shown in FIG. 1, when a constant voltage $V_D$ is applied to the deflecting electrodes 62 and 64, a constant electric field is generated which causes only the charged droplets 70 to be deflected and intercepted by the gutter structure 74. Uncharged droplets 72 will fall through and land perpendicularly on the substrate 86 or partially completed workpiece 80.

Figure 2:
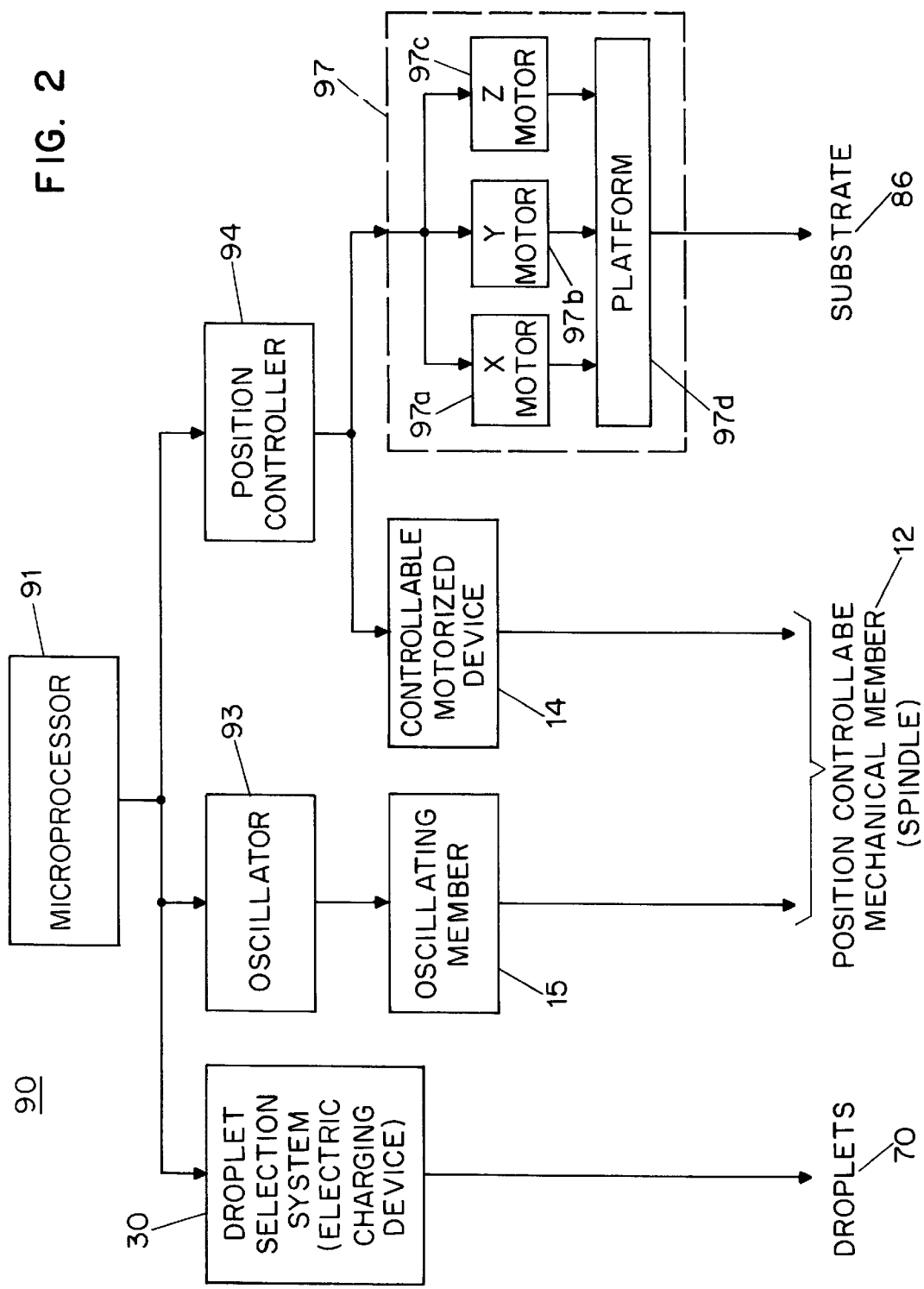
FIG. 2 is a schematic representation of a control system for use with the assembly of FIG. 1.

FIG. 2 is a schematic representation of a control system 90 for the drop deposition system 10 of FIG. 1. The control system 90 includes a programmable microprocessor 91 for issuing positioning instructions to a position controller 94. The position controller 94 in turn issues control signals to a position controllable platform 97, which includes a substrate supporting platform 97d and X, Y and Z coordinate motors 97a, 97b and 97c, respectively, which are used to position the substrate 86 beneath the sequence of falling droplets flowing from the nozzle orifice 18. The position controller 94 also issues control signals to the controllable motorized device 14 for varying the vertical position of the spindle 12 with respect to the nozzle orifice 18.

The position controllable platform 97 of the present embodiment is capable of translating in all three Cartesian axes with an accuracy in the order of one micrometer. An RS-232 interface (not shown) is used to connect the microprocessor 91 with the position controller 94. Preferably, instructions from the microprocessor 91 to the position controller 94 are provided in computer-aided design ("CAD") type formats and generated by a computer program that accepts geometric data representing the workpiece to be formed, and which slices the data into appropriate layers. The position controller 94 then generates the appropriate control signals for positioning the substrate and for varying the vertical position of the spindle 12 with respect to the nozzle orifice 18.

As such, the completed workpiece 80 is formed incrementally by building layers from the bottom up in sequential order. This is accomplished by properly controlling the X, Y and Z position coordinates of the substrate supporting platform 97d. The system is highly flexible in that a multitude of computer programs can be used to design and store data representing the objects to be formed. In addition, designs can be transmitted electronically to the system thus allowing for remote operation and resource networking.

As further shown in FIG. 2, the microprocessor 91 is also used for issuing instructions for controlling a programmable oscillator or function generator 93. The oscillator 93, which is coupled to the piezoelectric oscillating member 15, provides the appropriate oscillation frequency required to break up the circular liquid jet into a stream of droplets. As discussed above, the oscillation frequency is nominally within the range of a few hundred hertz to 100 kHz.

In addition, based on the vertical position of the spindle 12 and the frequency of the oscillating member 15, the microprocessor 91 generates instructions required to control the droplet selection system. In the embodiment of FIG. 1, for example, the microprocessor 91 selects the appropriate electrode segments 32, 34 and 36 by opening or closing the corresponding switches 38, 40 and 42. The microprocessor 91 uses a process model or slicing algorithm to select the undesired drops.

Figure 3:
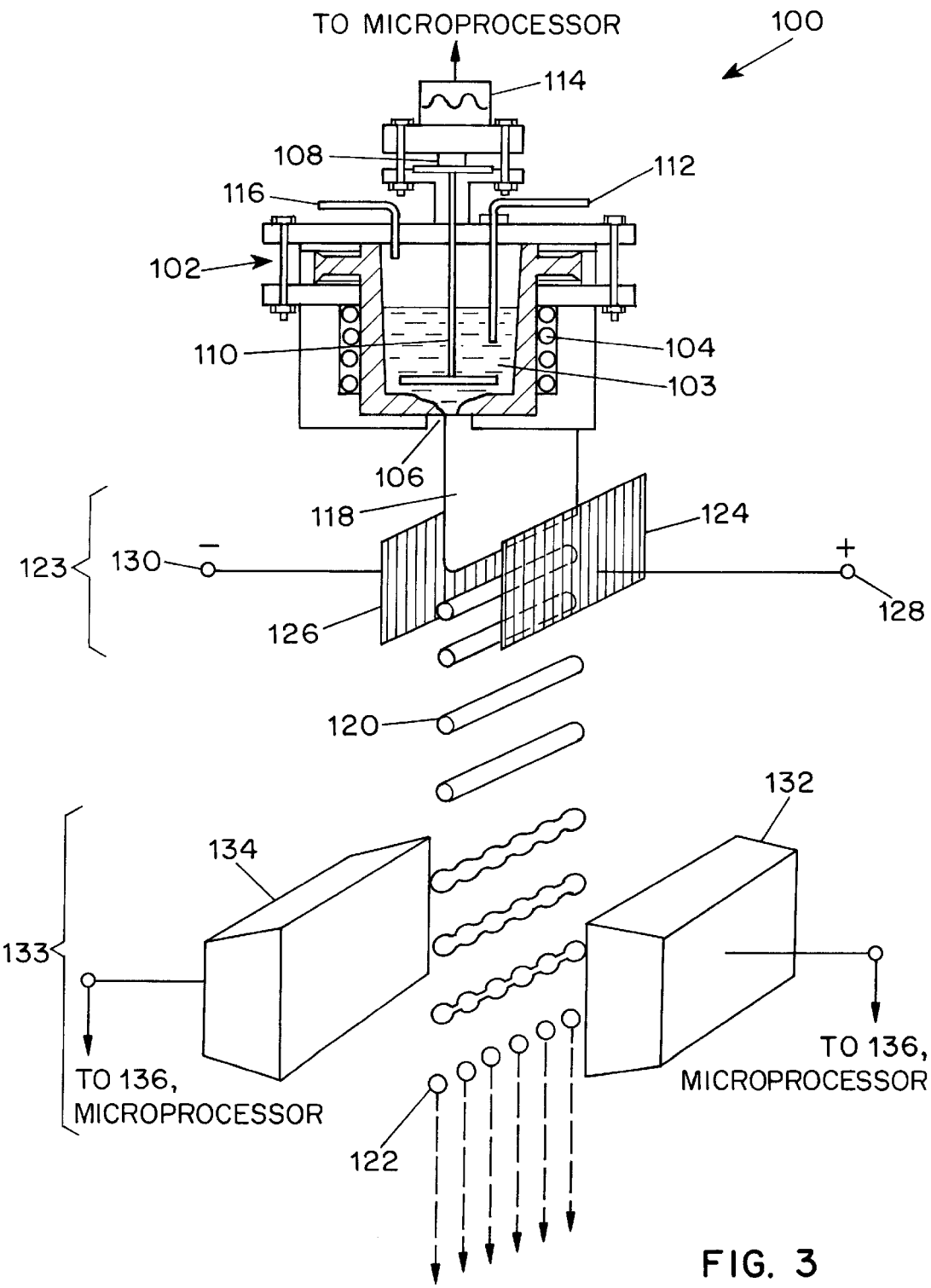
FIG. 3 is sectional view of a preferred embodiment of an assembly for forming a three-dimensional object wherein a fixed-sized planar jet is used to generate a uniform array of charged droplets.
Figure 4:
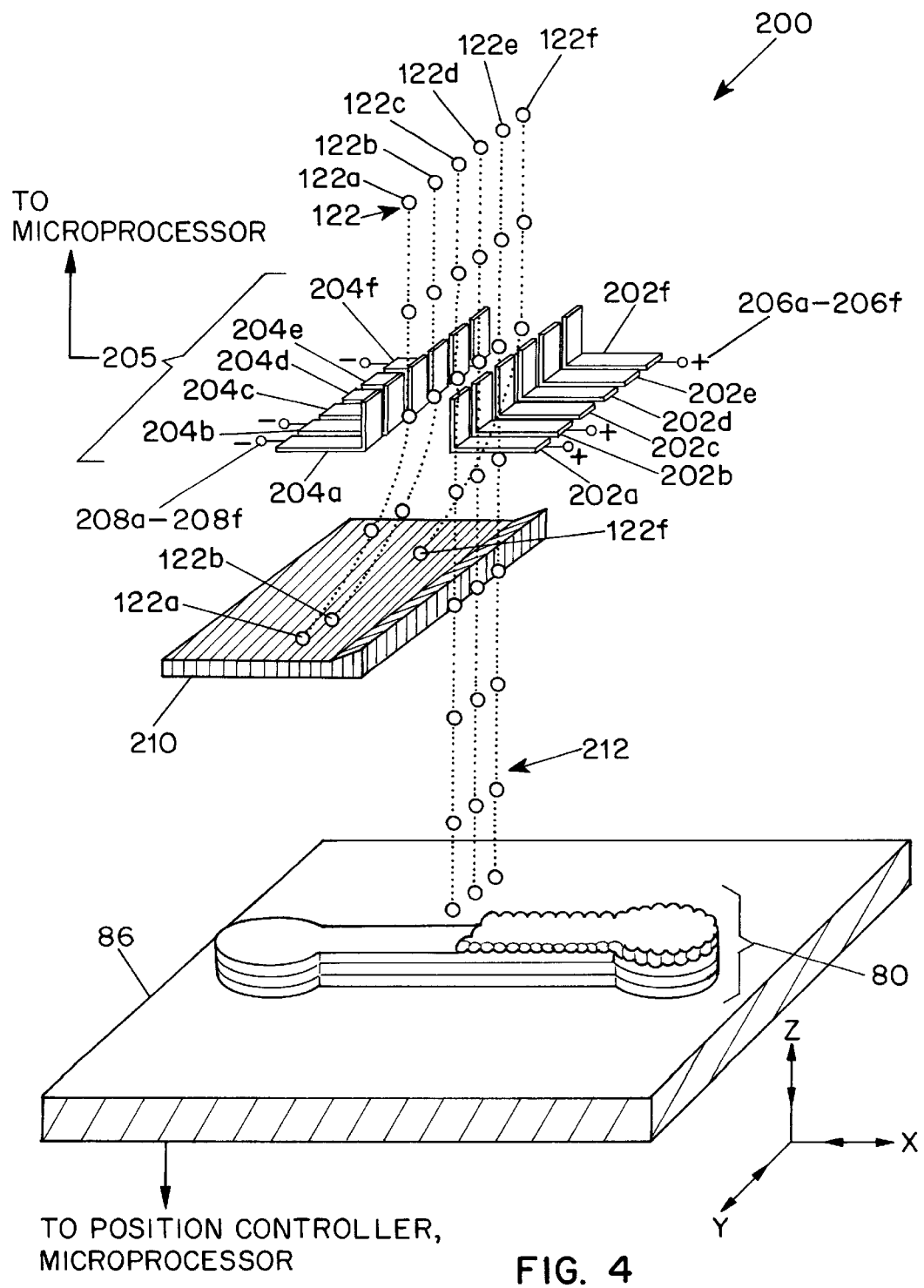
FIG. 4 is a perspective view of a preferred embodiment of a droplet selection system for use with the assembly of FIG. 3.

FIGS. 3 and 4 show a drop deposition system 100 and a corresponding electromagnetic droplet selection system 200, respectively. FIG. 3 is a sectional view of a planar jet drop deposition system 100 for forming a three-dimensional object wherein droplets are formed from a planar liquid jet 118 of molten forming material 103. The planar jet drop deposition system 100, not including element 123, is similar to the planar jet apparatus described by Tseng et al. in U.S. application Ser. No. 09/010,923. FIG. 4 is a perspective view of an electromagnetic droplet selection system 200 for use with the planar jet drop deposition system 100 of FIG. 3.

The planar jet drop deposition system 100 of FIG. 3 includes a crucible 102 for holding a reservoir of forming material 103, a heater element 104 surrounding the crucible 102 for melting and liquefying the forming material 103 contained within the crucible 102, a planar nozzle 106 disposed on the bottom of the crucible 102, and an external pressure source 116 for forcing the molten forming material 103 through the planar nozzle 106. A temperature sensor 112 is provided for monitoring the temperature of the forming material 103 within the crucible 102. When forced through the planar nozzle 106, the molten forming material forms a fixed-size planar jet 118 flowing towards a position controllable substrate 86.

In addition, the deposition system 100 includes a piezoelectric transducer 108 coupled to a vibrator 110 and a function generator 114 for agitating the molten forming material 103 such that it breaks up into a series of horizontal ligaments 120 as it falls away from the crucible 102. Nominally, the frequency of the oscillation frequency of the piezoelectric transducer 108 is within the range of a few hundred hertz to 100 kHz, depending on the size of the droplets being generated, i.e., the larger the droplets to be produced, the lower the frequency of excitation. On the other hand, the droplet production rate is linearly proportional to the frequency, which for example can be as high as 100 kHz for droplets having a diameter of 50 $\mu$m.

As with the preferred embodiment of FIG. 1, an optimal pressure differential of approximately 20 kPa across the planar nozzle 106 between the inside of the crucible 102 and outside opening of the planar nozzle 106 is required to form a stable planar liquid jet 118. However, the pressure differential can be within the range of 5 to 500 kPa. A pressurized, non-reactive gas, such as nitrogen, flowing into the crucible 102 through the external piping 116 is used to produce the desired pressure differential between the inside of the crucible 102 and the outside of the planar nozzle 106.

Referring again to FIG. 3, upon exiting the planar nozzle 106, the planar liquid jet 118 enters the deposition chamber, which itself is maintained under a vacuum or non-reactive environment filled with either nitrogen or helium. Because the molten material 103 is agitated by the piezoelectric transducer 108 and the vibrator 110 inside the crucible 102, the resulting surface tension causes the planar liquid sheet 118 to break up into a series of horizontal ligaments 120.

As further shown in FIG. 3, an electric charge is applied to each of the horizontal ligaments 120 using a planar electric charging device 123 located in the vicinity of the point where the horizontal ligaments 120 detach from the planar liquid sheet 118. Preferably, the planar electrode device 123 includes a first planar electrode 124 connected to a power supply 128, and a second planar electrode 126 connected to a power supply 130. When the first planar electrode 128 is positively charged with respect to the second planar electrode 126, electrons are drawn to the edge of the planar liquid jet 118 by electrostatic attraction and are carried away when the horizontal ligament detaches from the planar liquid jet 118. Once the ligament separates from the planar liquid jet 118, the ligament is electrically isolated and the charge cannot leak away.

The actual charge on a horizontal ligament 120 is thus proportional to the voltage $V_c$ across the planar electrodes 124 and 126. Nominally, the voltage $V_c$ is limited to a few hundred volts; if it were much greater, repulsion between adjacent charged horizontal columns would be unmanageable. Furthermore, as the voltage $V_c$ increases, repulsion between charges within a horizontal ligament eventually exceeds the surface tension of the liquid and causes the horizontal ligament to disintegrate.

The planar jet drop deposition system 100 of FIG. 3 also includes an acoustic device 133, which is used to further excite the charged horizontal ligaments 120 such that they break down into arrays 122 of uniformly charged droplets. As shown in FIG. 3, the acoustic device 133 includes a pair of audio speakers 132 and 134 mounted within the deposition chamber and connected to an audio signal generator 136. Preferably, the frequency of the audio signal generated by the signal generator 136 should be synchronized with the oscillation frequency of the piezoelectric transducer 108, which is nominally within the range of a few hundred hertz to 100 kHz depending upon the size of the droplets to be generated. In addition, the wavelength of the audio signal should be reasonably larger than the diameter of the droplets to be produced; nominally, the wavelength is chosen to be approximately twice as large as the droplet diameter such as to avoid agglomeration of molten droplets.

After the horizontal ligaments 120 are broken down into arrays 122 of uniformly charged droplets, the arrays 122 descend through the droplet selection system 200 as shown in FIG. 4. The droplet selection system 200 includes a multi-modulated deflection system 205 and a stationary gutter 210. Depending upon the geometry of the workpiece 80 to be formed on the substrate 86, some droplets are discarded. As such, the droplet selection system 200 allows droplets 122a through 122f of the droplet arrays 122 to be deposited only and precisely as required by the geometry and features of the workpiece 80.

The multi-modulated deflection system 205 of FIG. 4 includes a plurality of small electrode pairs 202a/204a through 202f/204f aligned vertically and horizontally with respect to the trajectory of the droplet arrays 122. Each electrode pair 202a/204a through 202f/204f is comprised of a positive and a negative electrode. For the undesired droplets 122a, 122b and 122f, as shown in FIG. 4, voltages from power supplies 206a/208a, 206b/208b and 206f/208f are independently applied to the corresponding small electrode pairs 202a/204a, 202b/204b and 202f/204f, thereby creating a local electric field between each of the charged positive and negative electrodes. The resulting local electric fields between electrode pairs 202a/204a, 202b/204b and 202f/204f cause the undesired droplets 122a, 122b and 122f to be deflected into the stationary gutter 210. In contrast, drops 122c through 122e are allowed to pass through uninterrupted.

As with the circular jet drop deposition system of FIG. 1, the electrode segments of the multi-modulated deflection system 205 are charged based on instructions provided by a process model integrated microprocessor (not shown). The electric charging levels of each individual electrode pair of the multi-modulated deflection system 205 are controlled by the integrated microprocessor.

The magnitude of the electric field at a given electrode pair is determined by the distance between the electrodes and by the magnitude of the applied voltages. In principle, droplets can be given either positive or negative charges so that they are deflected either upwards or downwards by the fixed voltage on the deflection plates. In practice, however, it is easier to design drive circuits that give a charge of the same polarity so that the selected droplets are all deflected in the same direction as shown in FIG. 4. If the strength of the electric field is zero, then the path of a charged droplet is unaffected by the electric field. The charged droplet then continues in its normal trajectory perpendicular to the substrate 86 or the partially completed workpiece 80.

Referring again to FIG. 3, although it is conceivable to vary the thickness of the planar liquid jet 118 by regulating the frequency of the external vibration near the nozzle orifice 106, the range of the thicknesses is limited due to the fixed cross-sectional area of the nozzle. As such, an adaptable planar nozzle apparatus 300 is shown in FIGS. 5A and 5B for varying the effective size of the planar nozzle.

Figure 5A:
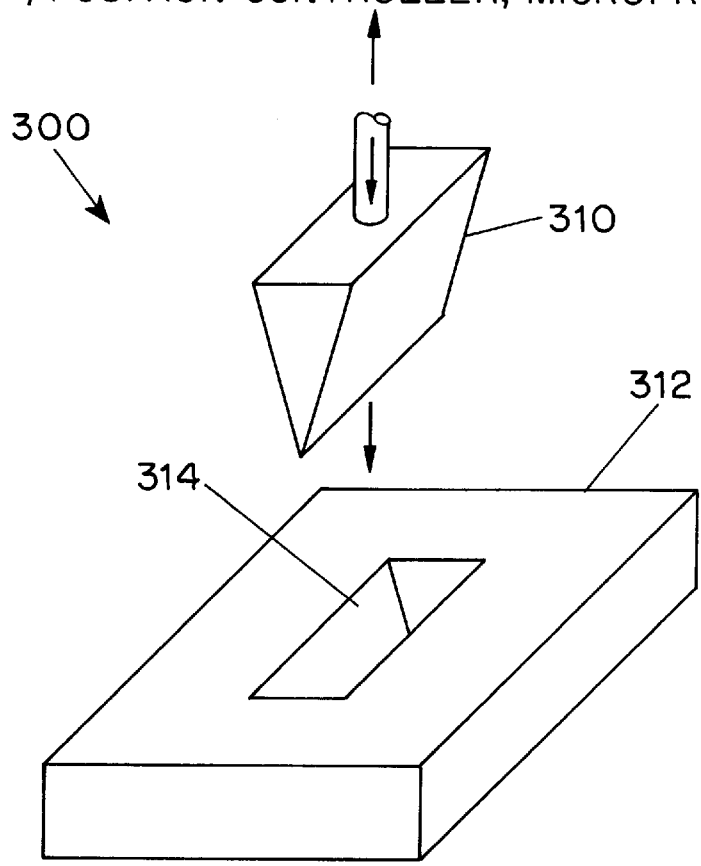
FIGS. 5A and 5B are perspective views of a preferred embodiment of an apparatus for use with the assembly of FIG. 3 wherein a wedge-shaped spindle and a wedge-shaped nozzle are used to form a variable-thickness planar jet for generating a uniform array of variable-diameter charged droplets of molten materials.
Figure 5B:
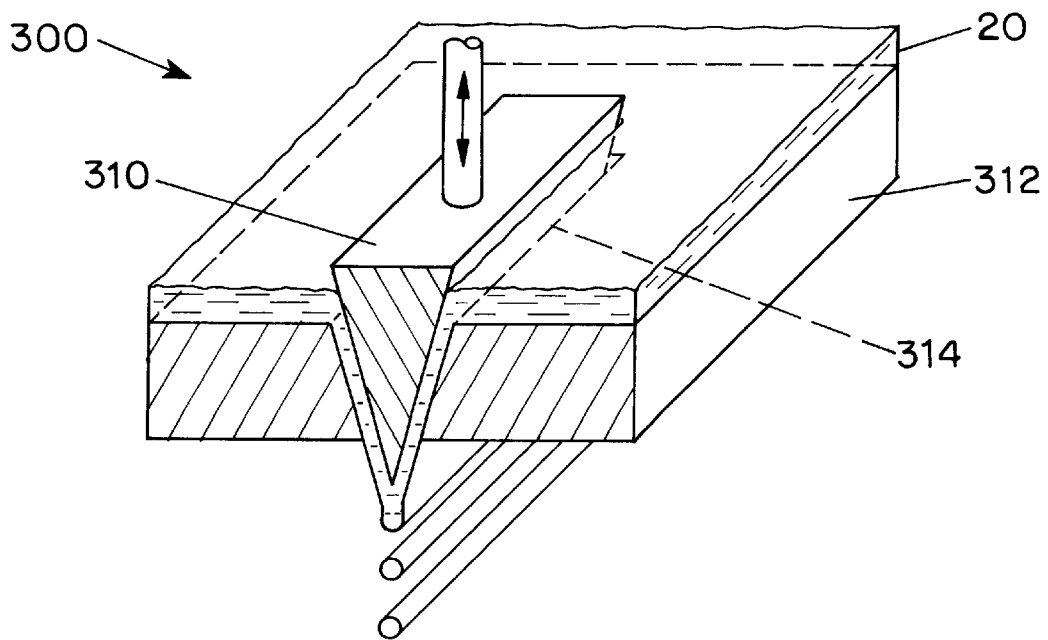

FIGS. 5A and 5B illustrate an adaptable planar nozzle apparatus 300 having a position controllable wedge-shaped spindle 310, a crucible 312, and a wedge-shaped nozzle 314 disposed in incrucible for varying the thickness of the liquid planar jet 118. Preferably, the wedge-shaped nozzle 314 is made from a hard metal or an abrasive ceramic material, such as fused silica, ruby, sapphire, carbides, and nitrides, etc., having a melting temperature substantially higher than that of the molten material to be deposited. In addition, it is critical that the wedge-shaped nozzle 314 not be wetted by the molten material.

By varying the vertical position of the wedge-shaped spindle 310 and the oscillation frequency of the piezoelectric transducer 108, the thickness of the planar liquid jet 118 is varied as the molten forming material is ejected from the wedge-shaped nozzle 314. When the wedge-shaped spindle 310 is completely removed from the wedge-shaped nozzle 314, there is no flow constriction and the effective thickness or width of the wedge-shaped nozzle 314 is the actual width of the wedge-shaped nozzle 314 itself. When the wedge-shaped spindle 310 is lowered into the wedge-shaped nozzle 314, the effective flow area is reduced and the flow of forming materials exiting the wedge-shaped nozzle 314 follows the contour of the wedge-shaped spindle 310 to form a rectangular planar jet having a thickness smaller than that of the actual wedge-shaped nozzle 314. Accordingly, the wedge-shaped spindle 310 coupled with the wedge-shaped nozzle 314, as shown in FIGS. 5A and 5B, can produce laminar planar jets having a wide range of thicknesses. Nominally, the tip angle for the wedge-shaped spindle 310 is within the range of 15 to 60 degrees.

By utilizing the wedge-shaped spindle 310 and the wedge-shaped nozzle 314 as described, a minimum ten-fold reduction in the planar jet thickness can be easily achieved. This corresponds to a factor of 10 change in flow area and hence mass flux. Since it is the thermal state of the droplet that directly affects the deposit microstructure, the metal product property is a very sensitive function of the droplet size. Thus, a capability to vary the droplet diameter from 50 $\mu$m to 500 $\mu$m, for example, is a significant enhancement over the current technology.

The planar jet drop deposition system of FIG. 3, combined with the drop selection system of FIG. 4 and the adaptable planar nozzle apparatus of FIGS. 5A and 5B thus allow (1) the microstructure of the workpiece to be controlled in a continuous process, and (2) the mass flux of the forming material to be directly controlled for optimum deposition of forming materials based upon the outline geometry of the workpiece at any given point. For example, large-scale features of a metal product can be optimally formed using large metal droplets, while fine features can be optimally formed using small droplets. The wedge-shaped spindle 310 itself can serve as the vibrator 110 of FIG. 3 to impart the external force required to break up the planar liquid jet 118 by connecting it to the piezoelectric transducer 108, or via a separate vibrating plate positioned near the nozzle orifice 314.

FIG. 6 is a schematic representation of a deposition control system 190 for use with the embodiments of FIGS. 3 through 5B. The deposition control system 190 is similar to the deposition control system 90 of FIG. 2, except that the microprocessor 191 in FIG. 6 also controls the audio signal generator 136 used to drive the loudspeakers 132 and 134. Also, the microprocessor 191 activates the deflecting electrodes 202a through 204f, rather than the charging electrode as in FIG. 2.

Figure 7:
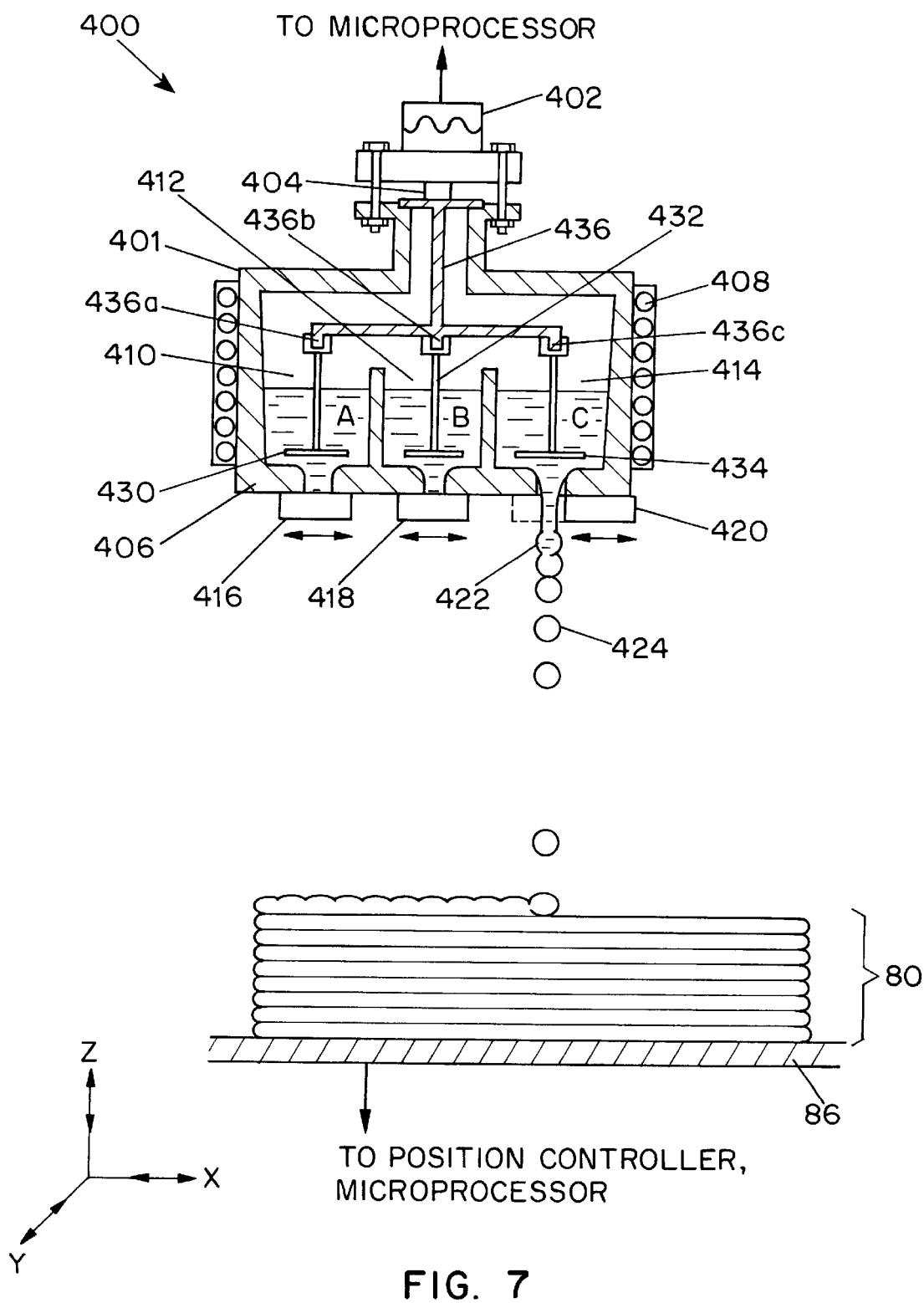
FIG. 7 is a sectional view of a multi-jet uniform drop generator according to a preferred embodiment of the present invention.

FIG. 7 is a sectional view of a multi-jet drop generator 400 according to another preferred embodiment of the present invention. The multi-jet uniform drop generator 400 utilizes either adaptable circular or planar liquid jets, and is ideal where at least two different types of forming materials are required for building the desired object, e.g., a building material and a supporting material. In addition, the multi-jet drop generator 400 can be used with the drop selection systems of FIGS. 1 and 4.

The multi-jet uniform drop generator 400 of FIG. 7 is a planar jet drop generator having three planar nozzles. The multi-jet generator 400 includes a modified heated crucible 401 having a heating element 408 and three compartments 410, 412 and 414 for providing building materials A and C and supporting material B. Each of the cylinders 410, 412 and 414 have corresponding computer-controlled nozzle covers 416, 418 and 422, which are opened and closed depending upon the geometry of the workpiece 80. The nozzle covers 416, 418 and 422 are operated such that only one material is deposited at any given moment.

As further shown in FIG. 7, the multi-jet generator 400 includes vibrators 430, 432 and 434, a piezoelectric transducer 404, a function generator 402 and a connector structure 436, which together function to agitate the molten forming materials into sequences of molten droplets 424. The connector structure 436 is arranged and constructed such that only one of the connectors 436a, 436b or 436c is linked to the piezoelectric transducer 404. Accordingly, only the vibrator corresponding to the open nozzle cover will vibrate.

Either deposition control system as shown in FIGS. 2 and 6 is adequate for the present embodiment, except that the microprocessor also controls the nozzle covers 416, 418 and 420 and the connectors 436a, 436b and 436c. Also, no controllable motorized device is required in the present embodiment to control the vertical position of the vibrators 430, 432 and 434.

A method is also disclosed for forming a three-dimensional object by selective deposition of a forming material on a substrate. The method includes the steps of heating a reservoir of a forming material in a container, ejecting a flow of the molten forming material from the container and through an opening formed on the bottom thereof, and selectively depositing the flow in layers on the substrate such that the forming material is deposited exclusively where required to form the three-dimensional object.

The method further includes the step of agitating the flow such that it breaks up into a sequence of droplets flowing towards the substrate. Advantageously, the depositing step includes the steps of selecting certain ones of the droplets to be discarded, electrically charging the selected droplets, and deflecting the charged droplets into a gutter structure. Thus, desired fixed-sized droplets are deposited on the substrate, and undesired droplets are discarded.

A second preferred method includes the additional step of varying the effective size of the container opening to form a variable-size flow of molten material through the container opening. Thus variable-size droplets are selectively deposited on the substrate.

In summary, the disclosed systems and methods for freeform fabrication can be used to manufacture complex three-dimensional objects having a wide range of features and sizes. Using the present invention, the freeform fabrication system can significantly increase the mass flow rate and/or decrease the product formation time. By the use of CAD models, slicing algorithms can be used to compute information required for building incremental layers with circular or planar jets of molten forming materials. The layering information can be used to operate associated droplet selection systems such that forming materials are deposited only and precisely where required to form the desired three-dimensional object.

In additional to freeform fabrication, the present invention is also useful for numerous end-use applications, including rapid solidification research, formation of metal matrix composites, formation of strips and metal coating. Moreover, the present invention can be used to perform fundamental experiments aimed at explaining how different droplet flow states determine process yield and the porosity and microstructure of deposited structures.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. In an arrangement for manufacturing a three-dimensional object by selectively and incrementally depositing a forming material on a substrate, an assembly for depositing said forming material comprising:

a container for holding a reservoir of said forming material;

an opening disposed in the bottom of said container through which said forming material flows towards said substrate; and a droplet deposition apparatus for generating a sequence of variable-diameter droplets from said flow of forming material and for selectively depositing said droplets on said substrate exclusively where required to form said three-dimensional object;

wherein the droplet deposition apparatus comprises means for dynamically varying the effective size of the opening.

2. The assembly according to claim 1, wherein:

said flow of forming material is a circular liquid jet; and said droplet deposition apparatus comprises:

a position controllable mechanical member for varying the diameter of said circular liquid jet and for breaking up said circular liquid jet into said sequence of variable-diameter droplets of said forming material; and a droplet selection system for determining which of said variable-diameter droplets are deposited on said substrate.

3. The assembly according to claim 2, wherein said droplet selection system comprises:

an electrical charging device for applying an electrical charge to selected ones of said variable-diameter droplets;

a deflector device for deflecting said charged droplets away from said substrate; and a gutter structure for accumulating said deflected droplets.

4. The assembly according to claim 3, wherein said electrical charging device comprises a plurality of separately addressable electrodes.

5. The assembly according to claim 2, further comprising:
a controllable motorized device coupled to said mechanical member for varying the position of said mechanical member with respect to said opening;
an oscillating member coupled to said mechanical member;
a controllable oscillator coupled to said oscillating member for providing an oscillation frequency required to break up said circular liquid jet into said sequence of variable-diameter droplets;
a position controllable platform for supporting and positioning said substrate along three axes beneath said sequence of variable-diameter droplets;
a programmable microprocessor for issuing positioning instructions for positioning said position controllable platform and controlling said controllable motorized device, for setting said oscillation frequency provided by said oscillator, and for controlling said drop selection system; and
a position controller responsive to said programmable microprocessor and to said positioning instructions for issuing control signals to said position controllable platform and said controllable motorized device.

6. The assembly according to claim 1, wherein:
said flow of forming material is a planar liquid jet; and
said droplet deposition apparatus comprises:
a position controllable mechanical member for varying the thickness of said planar liquid jet and for breaking up said planar liquid jet into a sequence of variable-diameter ligaments of forming material;
an acoustic device for breaking up each of said ligaments into an array of uniformly charged droplets; and
a droplet selection system for determining which of said charged droplets are deposited on said substrate.

7. The assembly according to claim 7, wherein said droplet selection system comprises:
an electrical charging device for applying an electrical charge to said ligaments;
a deflector device for deflecting selected ones of said charged droplets away from said substrate; and
a gutter structure for accumulating said deflected droplets.

8. The assembly according to claim 7, wherein said electrical charging device comprises a pair of planar electrodes.

9. The assembly according to claim 7, wherein said deflector device comprises a plurality of separately addressable electrode pairs.

10. The assembly according to claim 6, further comprising:
a controllable motorized device coupled to said mechanical member for varying the position of said mechanical member with respect to said opening;
an oscillating member coupled to said mechanical member;
a controllable oscillator coupled to said oscillating member for providing an oscillation frequency required to break up said planar liquid jet into said sequence of variable-diameter ligaments;
a position controllable platform for supporting and positioning said substrate along three axes beneath said array of uniformly charged droplets;
a programmable microprocessor for issuing positioning instructions for positioning said position controllable platform and controlling said controllable motorized device, for setting said oscillation frequency provided by said oscillator, and for controlling said drop selection system and said acoustic device; and
a position controller responsive to said programmable microprocessor and to said positioning instructions for issuing control signals to said position controllable platform and said controllable motorized device.

11. The assembly according to claim 6, wherein said acoustic device comprises:
a signal generator for generating an audio signal; and
a plurality of loudspeakers for propagating said audio signal in the vicinity of said ligaments.

12. The assembly according to claim 11, wherein the wavelength of said audio signal is approximately twice as large as the desired diameter of said uniformly charged droplets.

13. In an arrangement for manufacturing a three-dimensional object by selectively and incrementally depositing different forming materials on a substrate, an assembly for depositing said forming materials comprising:
a plurality of containers for holding reservoirs of said forming materials;
a plurality of closeable openings disposed one each in the bottom of each of said containers through which said forming materials flow towards said substrate;
a mechanical apparatus for forcing said forming materials through each of said containers, and for agitating said forming materials such that said forming materials break up into droplets flowing towards said substrate; and
a flow selection apparatus for controlling the flow of said forming materials such that only one of said forming materials is deposited on said substrate at any given moment;
wherein the mechanical apparatus comprises means for dynamically varying the effective size of the openings.

14. The assembly according to claim 13, wherein said assembly further comprises:
a droplet selection system for cooperating with said flow selection apparatus and for determining which of said droplets are deposited on said substrate.

15. The assembly according to claim 13, wherein said mechanical apparatus is operated so as to vary the effective size of said openings to form variable-size flows of said forming materials.

16. The assembly according to claim 13, wherein said flow selection apparatus comprises a plurality of controllable sliding opening covers.

17. The assembly according to claim 13, further comprising a programmable microprocessor for controlling said flow selection apparatus.

18. A method for forming a three-dimensional object by selectively and incrementally depositing a forming material on a substrate, the method comprising the steps of:

heating a reservoir of a forming material in a container having an opening on the bottom thereof;

dynamically varying the effective size of said opening to form a variable-size flow of said molten forming material through said opening;

ejecting said flow from said container and through said opening;

agitating said flow such that said flow breaks up into variable-diameter droplets flowing towards said substrate; and selectively depositing said flow in layers on said substrate exclusively where required to form said three-dimensional object.

19. The method according to claim 18, wherein said depositing step further comprises the steps of:

selecting certain ones of said droplets to be discarded;

electrically charging said selected droplets; and deflecting said charged droplets into a gutter structure and away from said substrate.

* * * * *

UNITED STATES PATENT AND TRADEMARK OFFICE
CERTIFICATE OF CORRECTION

PATENT NO. : 6,149,072
DATED : November 21, 2000
INVENTOR(S) : Tseng

It is certified that error appears in the above-identified patent and that said Letters Patent is hereby corrected as shown below:

Title page,
Item [56] References Cited, OTHER PUBLICATIONS,
Under Dombroski et al., "tregration" should read -- tegration --

Column 1,
Line 17, "usefull" should read -- useful --

Column 2,
Line 67, "variable-size" should read -- variable-sized --

Column 5,
Line 16, "liquified" should read -- liquefied --
Line 19, "break-up" should read -- break up --
Line 22, "three-axes" should read -- three axes --

Column 7,
Line 20, "in" should read -- on --

Column 10,
Line 13, "incrucible" should read -- crucible 312 --
Line 47, append to previous line Column 11,
Line 52, "on" should read -- in --

UNITED STATES PATENT AND TRADEMARK OFFICE
CERTIFICATE OF CORRECTION

PATENT NO. : 6,149,072
DATED : November 21, 2000
INVENTOR(S) : Tseng

It is certified that error appears in the above-identified patent and that said Letters Patent is hereby corrected as shown below:

Column 12,
Line 44, "object;" should read -- object, --
Line 49, "jet;" should read -- jet, --

Column 14,
Line 46, "moment;" should read -- moment, --
Line 57, "variable-size" should read -- variable-sized --

Column 15,
Line 2, "on" should read -- in --

Signed and Sealed this

Twenty-fifth Day of December, 2001

Attest:

Attesting Officer

JAMES E. ROGAN
Director of the United States Patent and Trademark Office